(12) United States Patent
Okubo et al.

(10) Patent No.: US 9,836,040 B2
(45) Date of Patent: Dec. 5, 2017

(54) MOTOR CONTROL DEVICE, MOTOR CONTROL SYSTEM AND MOTOR CONTROL METHOD

(71) Applicant: KABUSHIKI KAISHA YASKAWA DENKI, Kitakyushu-shi (JP)

(72) Inventors: Tadashi Okubo, Kitakyushu (JP); Isamu Matsumura, Kitakyushu (JP); Go Yamazaki, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/142,604

(22) Filed: Apr. 29, 2016

(65) Prior Publication Data

US 2016/0246281 A1    Aug. 25, 2016

Related U.S. Application Data

(63) Continuation of application No. PCT/JP2013/079946, filed on Nov. 5, 2013.

(51) Int. Cl.
*G05B 19/18* (2006.01)
*H02P 6/16* (2016.01)
(Continued)

(52) U.S. Cl.
CPC ......... *G05B 19/231* (2013.01); *G05B 19/404* (2013.01); *G05B 19/4142* (2013.01); *H02P 6/16* (2013.01); *G05B 2219/33218* (2013.01)

(58) Field of Classification Search
CPC ...... H02P 6/16; H02P 2101/15; H02P 25/034; H02P 25/06; H02P 6/006; H02P 6/18;
(Continued)

(56) References Cited

U.S. PATENT DOCUMENTS 4,893,201 A * 1/1990 Emori ................. G11B 5/5547
360/77.04
5,633,546 A * 5/1997 Horst .................... G01D 5/145
310/68 B
(Continued)

FOREIGN PATENT DOCUMENTS

JP       62-131795 A    6/1987
JP     2000-253689 A    9/2000
(Continued)

OTHER PUBLICATIONS

English translation of International Preliminary Report on Patentability and Written Opinion issued on May 19, 2016 in PCT/JP2013/079946.

(Continued)

*Primary Examiner* — Paul Ip
(74) *Attorney, Agent, or Firm* — Oblon, McClelland, Maier & Neustadt, L.L.P.

(57) ABSTRACT

A motor control device includes circuitry which reads a command value in synchronization with a control period, reads an output of an encoder connected to a motor, controls an output current to the motor based on the command value and the output of the encoder, and offsets a timing for reading the output of the encoder with respect to a timing for reading the command value.

20 Claims, 6 Drawing Sheets

(51) Int. Cl.
*G05B 19/23* (2006.01)
*G05B 19/404* (2006.01)
*G05B 19/414* (2006.01)

(58) Field of Classification Search
CPC ........ H02P 9/007; H02P 2209/07; H02P 6/10;
H02P 6/17; H02P 25/0925; H02P 25/08;
H02P 6/15; H02P 6/165; G01D 5/145
USPC ....... 318/569, 632, 400.04; 369/47.12, 47.15
See application file for complete search history.

(56) References Cited

U.S. PATENT DOCUMENTS

| | | | | |
|---|---|---|---|---|
| 5,737,342 | A * | 4/1998 | Ziperovich | G01B 31/31851 714/736 |
| 5,761,375 | A * | 6/1998 | Naito | H02P 6/17 318/632 |
| 6,215,426 | B1 * | 4/2001 | Taniguchi | G01D 5/24476 341/111 |
| 6,452,512 | B1 * | 9/2002 | Adkins | G01D 3/022 250/231.16 |
| 6,452,879 | B1 * | 9/2002 | Tsukahara | G11B 7/094 369/44.32 |
| 6,567,015 | B2 * | 5/2003 | Adkins | G01D 3/022 341/13 |
| 7,366,071 | B2 * | 4/2008 | Kihara | G11B 20/00086 369/47.12 |
| 7,505,388 | B2 * | 3/2009 | Kodama | G11B 7/1263 369/116 |
| 7,665,007 | B2 * | 2/2010 | Yang | G11B 20/10009 714/55 |
| 7,746,023 | B2 * | 6/2010 | Ajima | H02P 6/10 318/700 |
| 7,753,162 | B2 * | 7/2010 | Shiozawa | B62D 5/0472 180/443 |
| 8,089,171 | B2 * | 1/2012 | Li | H02P 6/16 290/44 |
| 8,089,172 | B2 * | 1/2012 | Li | H02P 6/16 290/44 |
| 8,130,605 | B2 * | 3/2012 | Ishikawa | G11B 7/08511 369/44.25 |
| 8,716,959 | B2 * | 5/2014 | David | G01D 5/145 318/135 |
| 8,848,767 | B2 * | 9/2014 | Kashima | H04L 12/403 375/219 |
| 2003/0007195 | A1 * | 1/2003 | Adkins | G01D 3/022 358/474 |
| 2005/0025031 | A1 * | 2/2005 | Kodama | G11B 7/1263 369/116 |
| 2005/0152255 | A1 * | 7/2005 | Kihara | G11B 20/00086 369/59.23 |
| 2006/0002689 | A1 * | 1/2006 | Yang | G11B 20/18 386/263 |
| 2007/0029129 | A1 * | 2/2007 | Shiozawa | B62D 6/04 180/446 |
| 2007/0132423 | A1 * | 6/2007 | Ajima | H02P 6/10 318/719 |
| 2008/0007855 | A1 * | 1/2008 | Vityaev | G11B 5/09 360/51 |
| 2009/0085558 | A1 * | 4/2009 | David | G01D 5/145 324/207.2 |
| 2010/0002553 | A1 * | 1/2010 | Ishikawa | G11B 7/08511 369/47.15 |
| 2010/0045219 | A1 * | 2/2010 | Ajima | H02P 6/10 318/400.04 |
| 2010/0320763 | A1 * | 12/2010 | Li | H02P 6/16 290/44 |
| 2011/0106488 | A1 * | 5/2011 | Fujita | G01C 22/006 702/150 |
| 2011/0109279 | A1 * | 5/2011 | Li | H02P 6/16 322/99 |
| 2012/0008929 | A1 * | 1/2012 | David | G01D 5/145 396/125 |
| 2012/0014682 | A1 * | 1/2012 | David | G01D 5/145 396/133 |
| 2012/0109562 | A1 * | 5/2012 | Yabuguchi | G01D 5/2046 702/87 |
| 2012/0303141 | A1 * | 11/2012 | Yuan | F15B 13/0433 700/28 |
| 2012/0314738 | A1 * | 12/2012 | Kashima | H04L 12/403 375/219 |
| 2013/0300324 | A1 * | 11/2013 | Kaufmann | G01D 5/24452 318/400.04 |
| 2016/0327409 | A1 * | 11/2016 | Bouallaga | G01D 5/145 |

FOREIGN PATENT DOCUMENTS

| | | |
|---|---|---|
| JP | 2011-077342 A | 4/2011 |
| JP | 2012-186897 A | 9/2012 |

OTHER PUBLICATIONS

International Search Report dated Dec. 17, 2013 in PCT/JP2013/079946, filed Nov. 5, 2013 (with English Translation).
Written Opinion dated Dec. 17, 2013 in PCT/JP2013/079946, filed Nov. 5, 2013.
Office Action dated Jul. 18, 2017, in Japanese Patent Application No, 2015-546182 (with English-language Translation).

* cited by examiner

MOTOR CONTROL DEVICE, MOTOR CONTROL SYSTEM AND MOTOR CONTROL METHOD

CROSS-REFERENCE TO RELATED APPLICATIONS

The present application is continuation of and claims the benefit of priority to International Application No. PCT/JP2013/079946, filed Nov. 5, 2013, the entire contents of which are incorporated herein by reference.

BACKGROUND OF THE INVENTION

Field of the Invention

The present invention relates to a motor control device, a motor control system and a motor control method.

Description of Background Art

Japanese Patent Laid-Open Publication No. 2000-253689 describes an AC servo motor control device employing digital control using a microprocessor. Each control period is set such that a control period of a host controller is an integer multiple of a control period of a power supplier, and further, a time difference between serial communication for control information transmission (between two microprocessors) and start of control processing is monitored, and the control periods are modified such that the time difference is a constant. The entire contents of this publication are incorporated herein by reference.

SUMMARY OF THE INVENTION

According to one aspect of the present invention, a motor control device includes circuitry which reads a command value in synchronization with a control period, reads an output of an encoder connected to a motor, controls an output current to the motor based on the command value and the output of the encoder, and offsets a timing for reading the output of the encoder with respect to a timing for reading the command value.

According to another aspect of the present invention, a motor control system includes a motor, a motor control device connected to a motor, and a controller connected to the motor control device and including first circuitry which outputs an operation command with respect to the motor control device. The motor control device includes second circuitry which reads a command value in synchronization with a control period, reads an output of an encoder connected to the motor, controls an output current to the motor based on the command value and the output of the encoder, and offsets a timing for reading the output of the encoder with respect to a timing for reading the command value.

According to yet another aspect of the present invention, a motor control method includes reading a command value in synchronization with a control period, reading an output of an encoder connected to a motor, controlling an output current to the motor based on the command value and the output of the encoder, and offsetting a timing for reading the output of the encoder with respect to a timing for reading the command value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
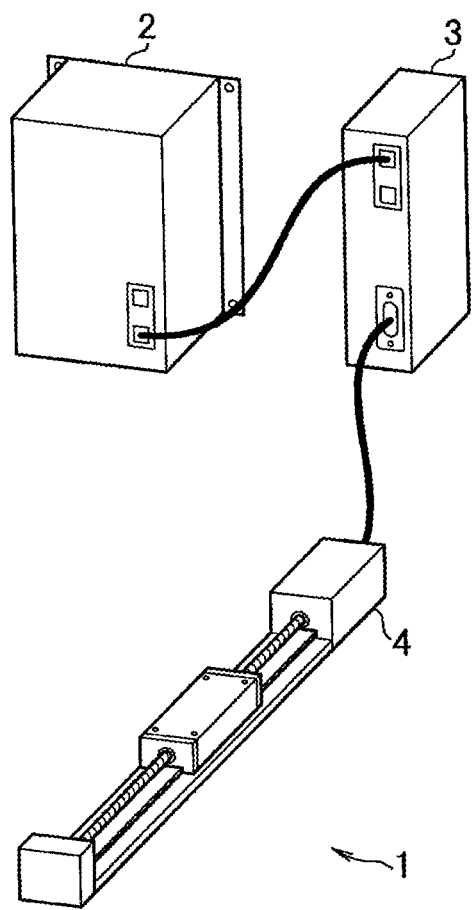
FIG. 1 is a schematic diagram illustrating an example of a motor control system according to an embodiment of the present invention.

The embodiments will now be described with reference to the accompanying drawings, wherein like reference numerals designate corresponding or identical elements throughout the various drawings.

Motor Control System

FIG. 1 is a schematic diagram illustrating an example of a motor control system 1 according to an embodiment of the present invention. In FIG. 1, a controller 2, a motor control device 3 and a motor 4 (illustrated as a drive source of a linear slider in FIG. 1) are illustrated.

The controller 2 is a device that controls various mechanical elements including the motor control device 3. The controller 2 causes various mechanical elements that are connected to the controller 2 to execute predetermined operations by executing any given mechanical control program such as a ladder program or a time chart and, in general, may be a device such as a PLC (Programmable Logic Controller), a sequencer or a motion controller.

The motor control device 3 is a device in which an amplifier that supplies power for operating the motor 4 and a control circuit of the amplifier are integrated. Here, a form of the motor 4 is not particularly limited. In the present embodiment, the motor 4 is a servo motor, and the motor control device 3 is in general a device such as a servo controller or a servo amplifier. Power is supplied from the motor control device 3 to the motor 4 via a wiring that connects the motor control device 3 and the motor 4. Further, a state of the motor 4 is transmitted to the motor control device 3 from an encoder such as a rotary encoder that is attached to the motor 4 or a linear encoder that is attached to a mechanical element (here, a slider of the linear slider) that is connected to the motor 4. Here, the encoder can be of any form, such as a rotary or linear encoder, or an absolute or incremental encoder.

The motor control system 1 illustrated in FIG. 1 is an example of a motor control system having a simplest structure. Any other device may be further added to the motor control system 1. Further, it is also possible that the controller 2 and the motor control device 3 are not physically separated but are integrated together.

In the above description about FIG. 1, description and illustration about other detailed structures and wirings, such as connection of a power line and a ground line, that are not required for the description of the present embodiment are omitted for simplicity. Further, connection mode and connector types, and types and the number of control target devices, are not particularly limited, and various modifications can be made.

Figure 2:
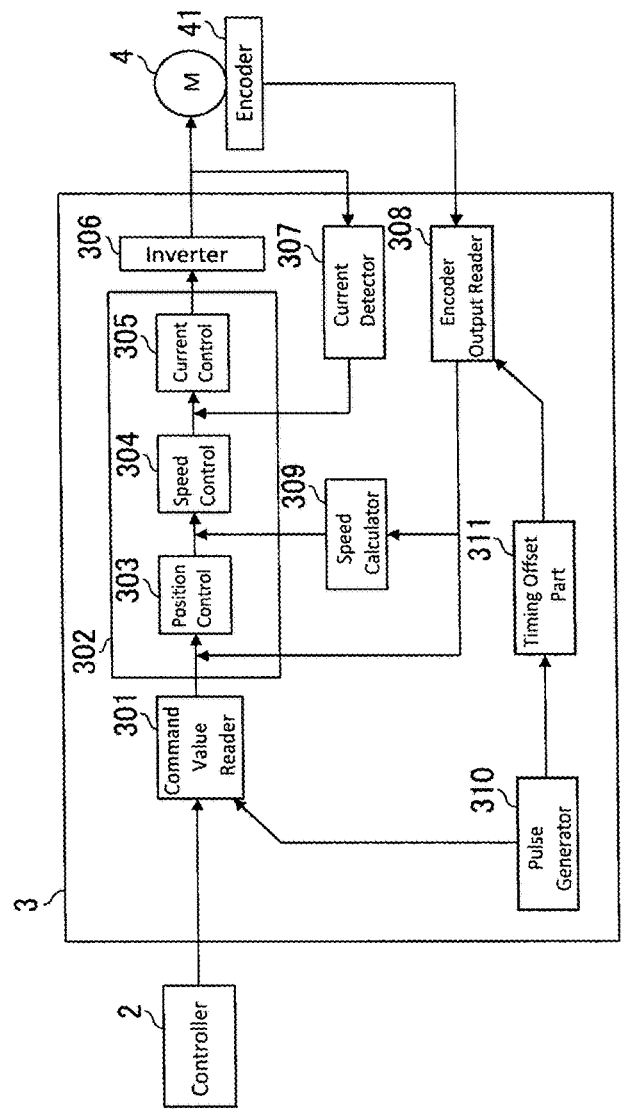
FIG. 2 is a functional block diagram of the motor control system.

FIG. 2 is a functional block diagram of the motor control system 1.

A command value to be followed by the motor 4 is transmitted from the controller 2 to the motor control device 3. The command value is read by a command value reader 301 of the motor control device 3. A form of the communication in this case is not particularly limited. However, in the present embodiment, the reading of the command value is performed via serial communication. A certain period of time (hereinafter, referred to as a command value reading time) is required for the reading of the command value. Further, the command value may be either a position command or a speed command of the motor 4. However, in the present embodiment, the command value is a position command.

The read command value is passed to a target controller 302. The target controller 302 is a part that controls an output current to the motor 4 based on the command value and an output of an encoder 41. Inside the target controller 302, a position control 303 that converts a position command to a speed target value, a speed control 304 that converts a speed target value to a torque target value (or an acceleration target value), and a current control 305 that converts a torque target value to a current target value, are included. In the following, a term "target control" is used in a sense of an action in which a target value of a physical quantity to be applied to a control target is determined based on an input command value. The target controller 302 of the present embodiment is a part that determines, based on an input command value, a target value of an output current that is a physical quantity to be applied to the motor 4, which is a control target, and performs target control.

The current target value obtained by the current control 305 is input to an inverter 306, and is converted to an AC current (for example, a three-phase AC current) suitable for driving the motor 4, which is output to the motor 4. The encoder 41 attached to motor 4 detects and outputs a current position of the motor 4. Here, the position of the motor 4 means a rotation angle of a output shaft of the motor 4, or a position of a mechanical element driven by an output of the motor 4.

The motor control device 3 illustrated in the present embodiment has feedback loop for a position, a speed and a current. A current output by the inverter 306 is detected by a current detector 307, and is fed back to the current control 305. Further, a position detected by the encoder 41 is read by an encoder output reader 308, and is fed back to the position control 303, and is converted to a speed by a speed calculator 309 to be fed back to the speed control 304. Here, a form of the communication between the encoder output reader 308 and the encoder 41 during the reading by the encoder output reader 308 is not particularly limited. However, in the present embodiment, serial communication is adopted. A certain period of time (hereinafter, referred to as an encoder output reading time) is required to read the output of the encoder 41. Further, the position-speed conversion processing by the speed calculator 309 is a kind of filter processing, and the filter processing also requires a certain period of time (hereinafter, referred to as a filter time). As will be described later, the filter processing is not limited to the position-speed conversion processing, and various other kinds of filter processing may also be performed.

Further, the motor control device 3 may further include other control blocks such as a feed forward block, a phase compensation block, and a disturbance observer.

Here, the motor control device 3 performs discrete control. In particular, the target controller 302 is a general-purpose information processing apparatus such as a micro controller or a dedicated information processing apparatus such as an ASIC (Application Specific Integrated Circuit) or a combination thereof, and performs the above-described control by executing information processing for each pre-determined control period.

That is, the target controller 302 reads a command value and an output of the encoder 41 for each control period. A timing of the reading of the command value and a timing of the reading of the output of the encoder 41 are dictated by a pulse generator 310.

The pulse generator 310 generates a pulse signal at a period equal to the control period. That is, the pulse signal and the control period are synchronized, and the pulse signal is a signal that indicates the control period. The command value reader 301 reads the command value in synchronization with the pulse signal. In the present embodiment, the command value reader 301 starts the reading of the command value at a timing of a leading edge of the pulse signal from the pulse generator 310. It is also possible that the timing of the reading of the command value by the command value reader 301 is a timing of a trailing edge of the pulse signal from the pulse generator 310, or is determined based on a signal other than a pulse signal, the signal indicating another control period.

Similarly, the timing of the reading of the output of the encoder 41 by the encoder output reader 308 is also dictated by the pulse generator 310. However, a timing offset part 311 is provided between the pulse generator 310 and the encoder output reader 308, the timing of the reading of the output of the encoder 41 by the encoder output reader 308 is offset relative to the timing of the reading of the command value by the command value reader 301.

Here, a function of the timing offset part 311 is to delay a pulse generated by the pulse generator 310 for a predetermined period of time (hereinafter, referred to as an offset time). Therefore, even when the reading of the output of the encoder 41 is started at the timing of the leading edge (or the timing of the trailing edge) of the pulse signal input to the encoder output reader 308, the operation is started at a timing that is offset by the offset time with respect to the timing of the pulse generated by the pulse generator 310.

Each of the above-described functional blocks of the motor control device 3 may be physically implemented by any structure. In the present embodiment, as an example, the command value reader 301 and the encoder output reader are formed using communication controllers employing an ASIC and the like; the target controller 302 and the speed calculator 309 are formed using digital processors such as a micro controller and an ASIC; the current detector 307 is formed using an AC/DC converter; the pulse generator 301 is formed using an appropriate oscillating circuit; and the timing offset part 311 is formed using an appropriate delay circuit.

Operation of Motor Control System of Comparative Example

In describing the operation of the motor control system 1 having the above-described structure, first, a motor control system 1 having a structure equivalent to that of FIG. 2 except that the timing offset part 311 is not provided is used as a comparative example, and operation of the comparative example is described.

Figure 3:
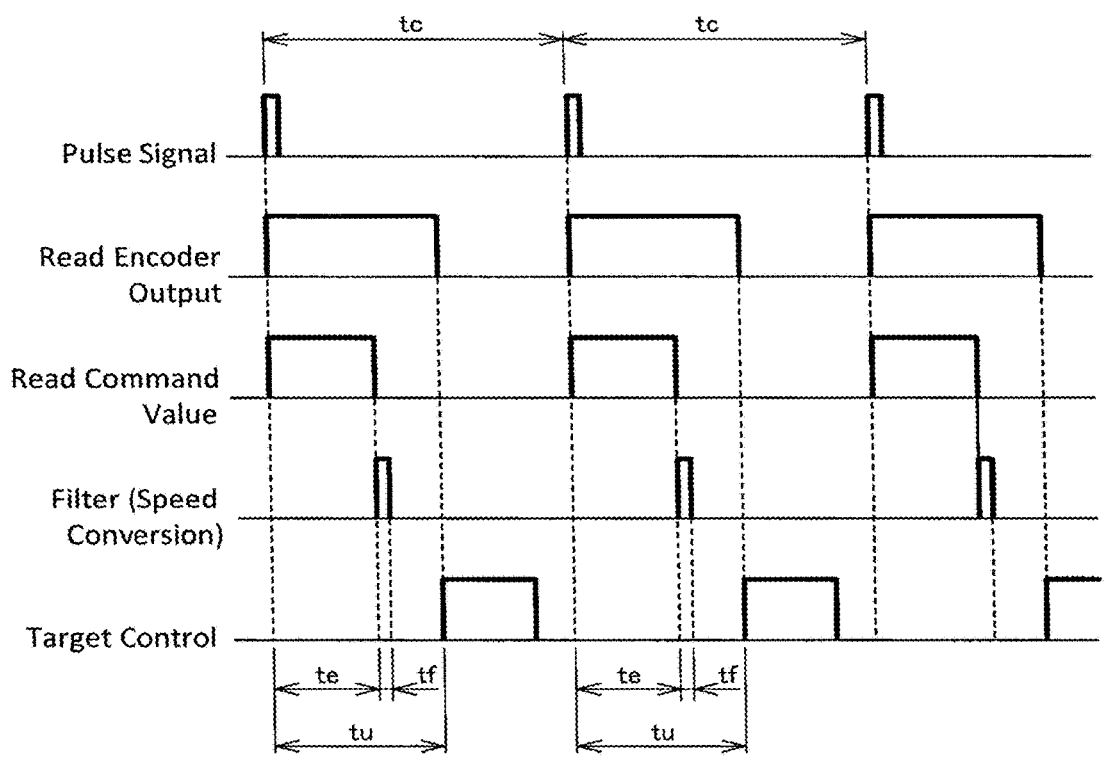
FIG. 3 illustrates a timing chart of a motor control system according to a comparative example.

FIG. 3 illustrates a timing chart of the motor control system according to the comparative example. Of the components contained in the motor control system according to the comparative example, components equivalent to those of the present embodiment are indicated using the same reference numeral symbols to facilitate description thereof.

In FIG. 3, a horizontal axis is a time axis, and timings of signals or operations are illustrated. A portion that is illustrated by a thick line on an upper side relative to a base line illustrated by a thin line means that a signal is high or an operation is being executed.

A pulse signal illustrated in an uppermost row is output by the pulse generator 310 for each control period (tc). In synchronization with the leading edge of the pulse signal, reading of a command value by the command value reader 301 and reading of an output of the encoder 41 by the encoder output reader 308 are performed. The reading of the command value requires a command value reading time (tu), and the reading of the output of the encoder 41 requires an encoder output reading time (te). Further, an appropriate filtering process with respect to the output of the encoder 41, here, speed conversion by the speed calculator 309 requires a filter time (tf).

Here, in order to perform target control by the target controller 302 illustrated in a lowermost row, the reading of the command value, the reading of the output of the encoder 41 and the filter processing have been completed. In the example illustrated here, tu>te+tf. Therefore, a timing of start of the target control is the time (tu) after the leading edge of the pulse signal. Therefore, regardless of the encoder output reading time (te) and the filter time (tf), a time period from the timing of the start of the reading of the output of the encoder 41 to the timing of the start of the target control is the command value reading time (tu).

Here, it is desirable that the output of the encoder 41 used in the target control by the target controller 302 be as close as possible to the state of the motor 4 when the target control is performed. The greater the deviation is between the output of the encoder 41 and the actual state of the motor 4, the greater a delay in response of the motor control system 1 occurs due to the deviation, and the greater a decrease in response performance of the motor control system 1 occurs. That is, in terms of improving the response performance, it is desirable that the reading of the output of the encoder 41 be as close as possible to the timing of the target control by the target controller 302.

However, in the comparative example illustrated in FIG. 3, the timing of the reading of the output of the encoder 41 is determined by the pulse signal, and the time period from the timing of the start of the reading of the output of the encoder 41 to the timing of the start of the target control is determined by the command value reading time (tu). Therefore, the timing of the reading of the output of the encoder 41 cannot be optimized.

Operation of Motor Control System

Therefore, as in the present embodiment illustrated in FIG. 2, the timing offset part 311 is provided, and the timing of the reading of the output of the encoder 41 is offset with respect to the timing of the reading of the command value by the command value reader 301. Thereby, the timing of the reading of the output of the encoder 41 can be optimized.

Figure 4:
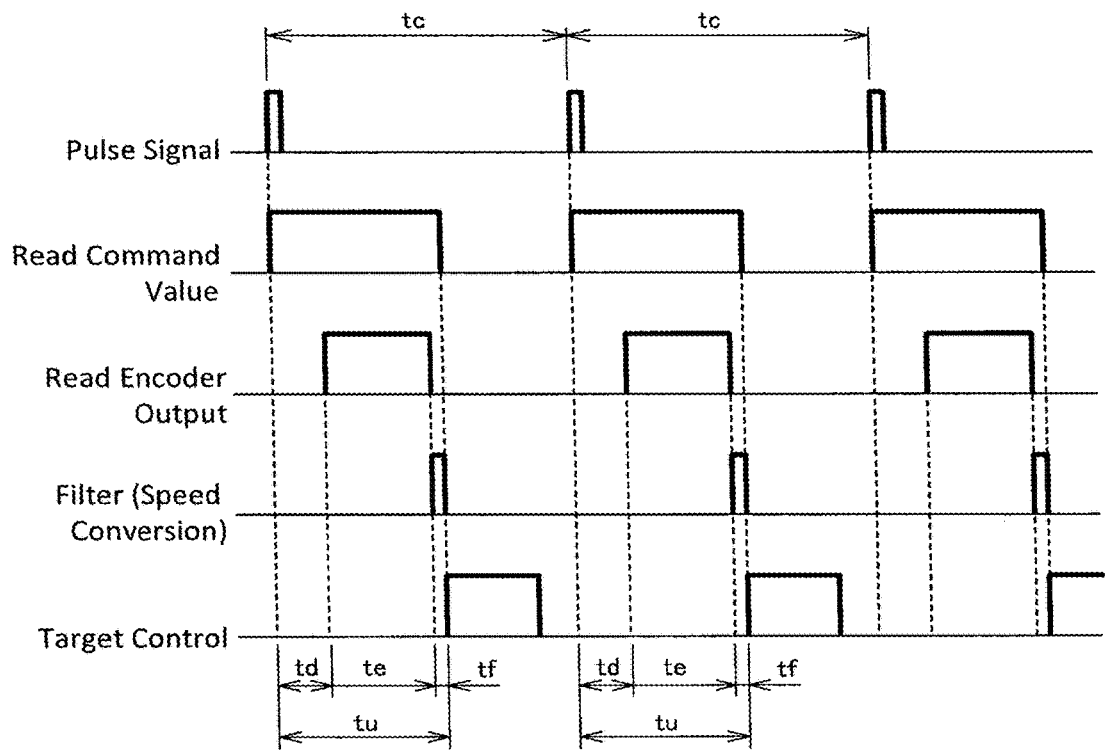
FIG. 4 illustrates a timing chart of the motor control system according to the present embodiment.

FIG. 4 illustrates a timing chart of the motor control system 1 according to the present embodiment.

In FIG. 4, which is similar to FIG. 3, a horizontal axis is a time axis, and timings of signals or operations are illustrated. Also in FIG. 4, as illustrated in an uppermost row, a pulse signal is output by the pulse generator 310 for each control period (tc). In this case, the reading of the command value by the command value reader 301 is performed in synchronization with the leading edge of the pulse signal. However, the reading of the output of the encoder 41 by the encoder output reader 308 is offset to a timing delayed by an offset time (td).

In this case, the offset time (td) is set to a value such that the timing of the start of the reading of the output of the encoder 41 is offset forward by a time period equal to or greater than a sum of the encoder output reading time (te) and the filter time (tf) with respect to the timing of the start of the target control by the target controller 302. Also in this example, tu>te+tf. However, in this case, ideally, td=tu−(te+tf).

In this way, the time period from the timing of the start of the reading of the output of the encoder 41 to the timing of the start of the target control is tu−td, which is shorter than the command value reading time (tu). Therefore, it becomes possible to use the output of the encoder 41 that is closer to the state of the motor 4 at the time when the target control is started, and the response performance of the motor control system 1 is improved.

In this case, when the filter processing is not required, it is also possible that the offset time (td) is set to a value such that the timing of the start of the reading of the output of the encoder 41 is offset forward by a time period equal to or greater than the encoder output reading time (te) with respect to the timing of the start of the target control by the target controller 302. Further, the filter processing is not limited to the position-speed conversion processing illustrated here, but may be any other processing such as any low pass filter processing, or Kalman filter processing, or a combination thereof.

Further, in the example illustrated in FIG. 4, the timing of the reading by the encoder output reader 308 is during the operation of the command value reader 301. This is a condition, for the case where tu>te+tf, for the time period from the timing of the start of the reading of the output of the encoder 41 to the timing of the start of the target control to be shortened as compare to the case where the reading of the output of the encoder 41 and the reading of the command value are performed at the same time. Further, in this case, within a time period of one cycle of the control period (tc), the output of the encoder 41 is read, and the output is used in the target control.

Figure 5:
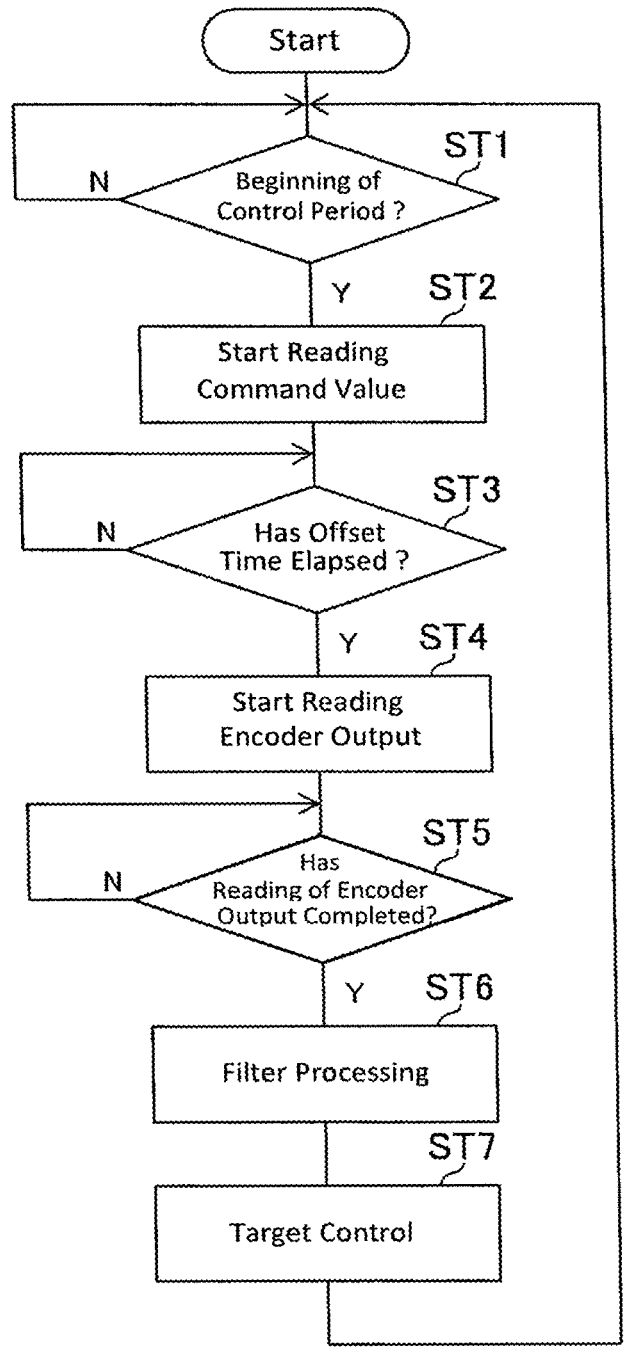
FIG. 5 is a flowchart illustrating operations of a motor control device in the motor control system according to the present embodiment.

FIG. 5 is a flowchart illustrating operations of the motor control device 3 in the motor control system 1 according to the present embodiment.

When operation is started, the motor control device 3 waits, at a process (ST1), for arrival of beginning of a control period. Here, the beginning of the control period is detected by a leading edge of a pulse signal by the pulse generator 310.

When the beginning of the control period arrives, the processing proceeds to a process (ST2), and reading of a command value by the command value reader 301 is started. Without waiting for completion of the reading of the command value, the processing proceeds to a process (ST3), and waits for a period of an offset time.

When the offset time has elapsed, the processing proceeds to a process (ST4), and reading of an output of the encoder 41 by the encoder output reader 308 is started. Then, the processing waits, at a process (ST5), for completion of the reading of the output of the encoder 41.

When the reading of the output of the encoder 41 is completed, the processing proceeds to a process (ST6), and the filter processing (here, the position-speed conversion processing by the speed calculator 309) is performed.

When the filter processing is completed, the read command value, the read output of the encoder 41 and the converted speed are passed to the target controller 302 and, at a process (ST7), the target control is performed. After the target control is completed, the processing returns again to the process (ST1) to be ready for a control period of a next cycle.

The offset time at the process (ST3) is set to a value such that the reading of the command value is completed at the time when the process (ST6) is completed. Therefore, in the flowchart illustrated here, the reading of the command value is not detected. However, it is also possible that the reading of the command value is detected at a stage before the process (ST7).

Figure 6:
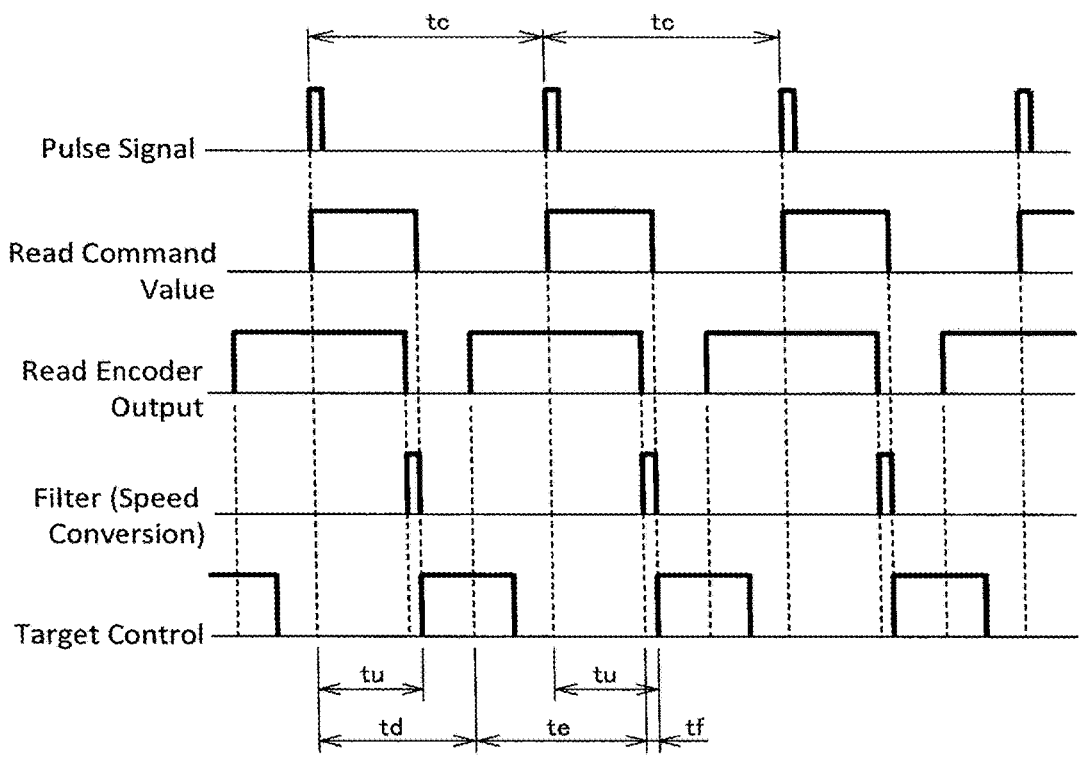
FIG. 6 is a timing chart illustrating another example of the motor control system according to the present embodiment.

FIG. 6 is a timing chart illustrating another example of the motor control system 1 according to the present embodiment.

In FIG. 6, which also is similar to FIG. 3, a horizontal axis is a time axis, and timings of signals or operations are illustrated. Also in FIG. 6, as illustrated in an uppermost row, a pulse signal is output by the pulse generator 310 for each control period (tc). Reading of a command value by the command value reader 301 is performed in synchronization with a leading edge of the pulse signal. Reading of an output of the encoder 41 by the encoder output reader 308 is offset to a timing that is delayed by an offset time (td).

Here, as a condition, te+tf>tu. Also in this case, the offset time (td) is set to a value such that the timing of the start of the reading of the output of the encoder 41 is offset forward by a time period equal to or greater than a sum of the encoder output reading time (te) and the filter time (tf) with respect to the timing of the start of the target control by the target controller 302.

In this case, the time period from the timing of the leading edge of the pulse signal to the timing of the start of the target control is the command value reading time (tu), and te+tf is longer than the command value reading time (tu). Therefore, ideally, the offset time (td) is td=(tc+tu)−(te+tt). As is apparent from FIG. 6, the time period from the timing of the start of the reading of the output of the encoder 41 to the timing of the start of the target control is a required minimum time period. Then, the timing of the reading by the encoder output reader 308 is during the operation of the target controller 302, and the output of the encoder 41 of which the reading is started during a cycle of a control period (tc) is used in the target control during the next cycle. That is, the reading of the output of the encoder 41 that is used during one cycle of a control period (tc) has been started during an immediately previous cycle. Thereby, waste of time is eliminated. In the example illustrated here, the reading of the output of the encoder 41 is performed over two adjacent cycles.

In this way, the time period from the reading of the command value to the timing of the start of the target control is the command value reading time (tu), and the overall control period (tc) can be shortened. Therefore, also in this case, the response performance of the motor control system 1 is improved.

In FIG. 2, the motor control system 1 is structured such that the timing offset part 311 is provided between the pulse generator 310 and the encoder output reader 308 to offset the timing of the reading of the output of the encoder 41 by the encoder output reader 308. This structure has advantages such as the following. The offset time can be more easily adjusted with less impact on the structure of the target controller 302 by changing the timing for reading the output of the encoder 41 than by changing the timing for reading the command value. Offset time adjustment due to replacement or an individual difference of the encoder 41 can be easily handled. However, it is also possible that the timing offset part 311 is provided between the pulse generator 310 and the command value reader 301, or is provided both between the pulse generator 310 and the command value reader 301 and between the pulse generator 310 and the encoder output reader 308.

The above-described embodiment is illustrated as specific examples. The invention described in the present specification is not limited to the structures of these specific examples. Various modifications of the embodiments such as modifying shapes, number and positioning of physical structures may be carried out. Further, the illustrated flowchart is an example of control. Other algorithm capable of achieving the same function may also be adopted. The technical scope of the invention described in the present specification also includes these modifications.

Modern motor control is performed using a digital processor in most cases and thus becomes discrete control, and sampling frequency when feedback is performed affects response performance and stability. The feedback in motor control is performed by inputting, to a digital processor, an output of an encoder that is provided in a mechanical element such as a motor or a table driven by a motor. However, for improving response performance in motor control, not only the sampling frequency, but also a timing of inputting the output of the encoder to the digital processor, affects the response performance.

A motor control device according to an embodiment of the present invention, a motor control system according to an embodiment of the present invention and a motor control method according to an embodiment of the present invention improve response performance in discrete control of a motor.

According to one aspect of the present invention, a motor control device includes: a command value reader that reads a command value in synchronization with a control period; an encoder output reader that reads an output of an encoder; a target controller that controls an output current to a motor based on the command value and the output of the encoder; and a timing offset part that offsets a timing of the reading of the output of the encoder by the encoder output reader with respect to a timing of the reading of the command value by the command value reader.

According to another aspect of the present invention, in the motor control device, the timing of the reading by the encoder output reader may be a timing that is offset, with respect to a timing of start of operation of the target controller, by a time period equal to or greater than a time period required for the reading of the output of the encoder by the encoder output reader.

According to another aspect of the present invention, in the motor control device, the timing of the reading by the encoder output reader may be a timing that is offset, with respect to the timing of the start of the operation of the target controller, by a time period equal to or greater than a sum of the time period required for the reading of the output of the encoder by the encoder output reader and a time period in which a filter is applied to the output of the encoder.

According to another aspect of the present invention, in the motor control device, the timing of the reading by the encoder output reader may be during operation of the command value reader.

According to another aspect of the present invention, in the motor control device, the timing of the reading by the encoder output reader may be during the operation of the target controller.

According to another aspect of the present invention, in the motor control device, the timing offset part may offset the timing of the reading by the encoder output reader with respect to a timing of a signal that indicates the control period.

According to another aspect of the present invention, in the motor control device, the timing offset part may offset the timing of the reading by the encoder output reader with respect to a leading edge or a trailing edge of a pulse of the signal that indicates the control period.

Further, according another aspect of the present invention, a motor control system includes: any one of the above-described motor control devices; a motor that is connected to the motor control device; and a controller that is connected to the motor control device and outputs an operation command with respect to the motor control device.

Further, according to another aspect of the present invention, a motor control method includes: a process of reading a command value in synchronization with a control period; a process of reading an output of an encoder; a process of controlling an output current to a motor based on the command value and the output of the encoder; and a process of offsetting a timing of the reading of the output of the encoder with respect to a timing of the reading of the command value.

According to an embodiment of the present invention, response performance in discrete control of a motor can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A motor control device, comprising:
   a first detecting circuit configured to detect a command value in synchronization with a control period,
   a second detecting circuit configured to detect an output of an encoder connected to a motor,
   processing circuitry configured to control an output current to the motor based on the command value and the output of the encoder, and
   an offset circuit configured to offset a timing for reading the output of the encoder with respect to a timing for reading the command value.

2. The motor control device according to claim 1, wherein the offset circuit is configured to offset the timing for reading the output of the encoder by a time period equal to or greater than a time period required for reading the output of the encoder with respect to a timing for starting control of the output current.

3. The motor control device according to claim 2, wherein the offset circuit is configured to offset the timing for reading the output of the encoder by a time period equal to or greater than a sum of a time period required for reading the output of the encoder and a time period in which a filter is applied to the output of the encoder with respect to a timing for starting control of the output current.

4. The motor control device according to claim 1, wherein the offset circuit is configured to offset the timing for reading the output of the encoder during operation for reading the command value.

5. The motor control device according to claim 1, wherein the offset circuit is configured to offset the timing for reading the output of the encoder during operation for controlling the output current.

6. The motor control device according to claim 1, wherein the offset circuit is configured to offset the timing for reading the output of the encoder with respect to a timing of a signal that indicates the control period.

7. The motor control device according to claim 6, wherein the offset circuit is configured to offset the timing for reading the output of the encoder with respect to a leading edge or a trailing edge of a pulse of the signal that indicates the control period.

8. The motor control device according to claim 2, wherein the offset circuit is configured to offset the timing for reading the output of the encoder during operation for reading the command value.

9. The motor control device according to claim 3, wherein the offset circuit is configured to offset the timing for reading the output of the encoder during operation for reading the command value.

10. A motor control system, comprising:
    a motor;
    a motor control device connected to the motor; and
    a controller connected to the motor control device and comprising first circuitry configured to output an operation command with respect to the motor control device,
    wherein the motor control device comprises
    a first detecting circuit configured to detect a command value in synchronization with a control period, a second detecting circuit configured to detect an output of an encoder connected to the motor, processing circuitry configured to control an output current to the motor based on the command value and the output of the encoder, and an offset circuit configured to offset a timing for reading the output of the encoder with respect to a timing for reading the command value.

11. The motor control system according to claim 10, wherein the offset circuit of the motor control device is configured to offset the timing for reading the output of the encoder by a time period equal to or greater than a time period required for reading the output of the encoder with respect to a timing for starting control of the output current.

12. The motor control system according to claim 11, wherein the offset circuit of the motor control device is configured to offset the timing for reading the output of the encoder by a time period equal to or greater than a sum of a time period required for reading the output of the encoder and a time period in which a filter is applied to the output of the encoder with respect to a timing for starting control of the output current.

13. The motor control system according to claim 10, wherein the offset circuit of the motor control device is configured to offset the timing for reading the output of the encoder during operation for reading the command value.

14. The motor control system according to claim 10, wherein the offset circuit of the motor control device is configured to offset the timing for reading the output of the encoder during operation for controlling the output current.

15. The motor control system according to claim 10, wherein the offset circuit of the motor control device is configured to offset the timing for reading the output of the encoder with respect to a timing of a signal that indicates the control period.

16. The motor control system according to claim 15, wherein the offset circuit of the motor control device is configured to offset the timing for reading the output of the encoder with respect to a leading edge or a trailing edge of a pulse of the signal that indicates the control period.

17. The motor control system according to claim 11, wherein the offset circuit of the motor control device is configured to offset the timing for reading the output of the encoder during operation for reading the command value.

18. The motor control system according to claim 12, wherein the offset circuit of the motor control device is configured to offset the timing for reading the output of the encoder during operation for reading the command value.

19. A motor control method, comprising:
   detecting, by a first detecting circuit, a command value in synchronization with a control period;
   detecting, by a second detecting circuit, an output of an encoder connected to a motor;
   controlling, by processing circuitry, an output current to the motor based on the command value and the output of the encoder; and
   offsetting, by an offset circuit, a timing for reading the output of the encoder with respect to a timing for reading the command value.

20. The motor control method according to claim 19, wherein the offsetting of the timing for reading the output of the encoder, by the offset circuit, comprises offsetting the timing for reading the output of the encoder by a time period equal to or greater than a time period required for reading the output of the encoder with respect to a timing for starting control of the output current.

* * * * *